United States Patent
Saur et al.

(10) Patent No.: US 11,210,791 B2
(45) Date of Patent: Dec. 28, 2021

(54) COMPUTER-IMPLEMENTED METHOD FOR LOCATING POSSIBLE ARTIFACTS IN A VIRTUALLY STAINED HISTOLOGY IMAGE

(71) Applicant: Carl Zeiss Meditec AG, Jena (DE)

(72) Inventors: Stefan Saur, Aalen (DE); Christoph Hauger, Aalen (DE); Gerald Panitz, Bopfingen (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 17/188,866

(22) Filed: Mar. 1, 2021

(65) Prior Publication Data
US 2021/0279875 A1  Sep. 9, 2021

(30) Foreign Application Priority Data

Mar. 3, 2020 (DE) ..................... 10 2020 105 697.4

(51) Int. Cl.
*G06T 7/00* (2017.01)
*G06T 7/269* (2017.01)
*G06T 7/13* (2017.01)

(52) U.S. Cl.
CPC .............. *G06T 7/0014* (2013.01); *G06T 7/13* (2017.01); *G06T 7/269* (2017.01); *G06T 2207/20036* (2013.01); *G06T 2207/20081* (2013.01); *G06T 2207/20084* (2013.01); *G06T 2207/30024* (2013.01)

(58) Field of Classification Search
None
See application file for complete search history.

(56) References Cited

U.S. PATENT DOCUMENTS

| 2010/0128988 | A1  | 5/2010 | Kincaid |
| 2012/0082362 | A1* | 4/2012 | Diem ..................... G01N 21/31 382/133 |

(Continued)

OTHER PUBLICATIONS

Bayramoglu, N. et al., "Towards Virtual H&E Staining of Hyperspectral Lung Histology Images Using Conditional Generative Adversarial Networks" IEEE International Conference on Computer Vision Workshop (ICCVW, Oct. 22-29, 2017), pp. 64 to 71.

(Continued)

*Primary Examiner* — Jiangeng Sun
(74) *Attorney, Agent, or Firm* — Walter Ottesen, P.A.

(57) ABSTRACT

A computer-implemented method for locating possible artifacts in a virtually stained histology image, which was obtained from an initial histology image, is provided. In the method, at least one further image is generated on the basis of the virtually stained histology image or the initial histology image. The differences between the at least one further image and the virtually stained histology image are determined when the at least one further image has been generated on the basis of the initial histology image or the differences between the at least one further image and the initial histology image are determined when the at least one further image has been generated on the basis of the virtually stained histology image, and a mapping from the determined differences to their positions in the virtually stained histology image is created. The positions in the virtually stained histology image represent the positions of possible artifacts.

15 Claims, 6 Drawing Sheets

(56) References Cited

U.S. PATENT DOCUMENTS

| | | | | |
|---|---|---|---|---|
| 2012/0269417 | A1* | 10/2012 | Bautista | G01N 1/312 |
| | | | | 382/133 |
| 2012/0328178 | A1* | 12/2012 | Remiszewski | A61B 5/7257 |
| | | | | 382/133 |
| 2018/0088308 | A1* | 3/2018 | Liu | G02B 21/367 |
| 2018/0247101 | A1* | 8/2018 | Wimberger-Friedl | |
| | | | | G06K 9/00147 |
| 2018/0349757 | A1* | 12/2018 | Ando | G06N 3/04 |
| 2020/0177767 | A1* | 6/2020 | Kelly | H04N 1/56 |
| 2020/0226462 | A1* | 7/2020 | Maddison | G06K 9/00134 |
| 2020/0279354 | A1* | 9/2020 | Klaiman | G06T 5/005 |
| 2020/0310100 | A1* | 10/2020 | Ozcan | G03H 1/0866 |
| 2020/0388028 | A1* | 12/2020 | Agus | G16H 50/20 |
| 2021/0043331 | A1* | 2/2021 | Ozcan | G06K 9/6267 |
| 2021/0050094 | A1* | 2/2021 | Orringer | G01N 21/65 |
| 2021/0118128 | A1* | 4/2021 | Cheng | G06N 3/0454 |
| 2021/0158524 | A1* | 5/2021 | Madabhushi | G06N 3/04 |

OTHER PUBLICATIONS

Cho, H. et al.,"Neural Stain-Style Transfer Learning using GAN for Histopathological Images" in arXiv:1710.08543v2 [cs.CV] Oct. 25, 2017, pp. 1 to 10.

Cook, John D., "Three algorithms for converting color to grayscale" John D. Cook Consulting, posted on Aug. 24, 2009 by John, 13 pages.

Lahiani, A. et al., "Virtualization of Tissue Staining in Digital Pathology Using an Unsupervised Deep Learning Approach" in arXiv:1810.06415v1 [cs.CV] Oct. 15, 2018, 5 pages.

Rana, A. et al., "Computational Histological Staining and Destaining of Prostate Core Biopsy RGB Images with Generative Adversarial Neural Networks" in ArXiv: 1811.02642v1 [cs.CV] Oct. 26, 2018, 7 pages.

Rivenson, Y. et al., "PhaseStain: the digital staining of label-free quantitative face microscopy images using deep learning" in Light: Science & applications (2019)8:23, pp. 1 to 11.

Rivenson, Y. et al.,"Virtual histological staining of unlabeled tissue-autofluorescence images via deep learning" in nature biomedical engineering 3,466-477 (2019), 23 pages.

Shaban, M T. et al., "StainGAN: Stain Style Transfer for Digital Histological Images" in arXiv:1804.01601v1 [cs.CV] Apr. 4, 2018, pp. 1 to 8.

Xu, Z. et al., "GAN-based Virtual Re-Staining: A Promising Solution for Whole Slide Image Analysis" in arXiv:1901.04059v1 [cs.CV] Jan. 13, 2019, pp. 1 to 16.

English translation of the Decision to Grant of the German Patent Office dated Nov. 20, 2020 in German patent application 10 2020 105 697.4 on which the claim of priority is based.

\* cited by examiner

COMPUTER-IMPLEMENTED METHOD FOR LOCATING POSSIBLE ARTIFACTS IN A VIRTUALLY STAINED HISTOLOGY IMAGE

CROSS REFERENCE TO RELATED APPLICATION

This application claims priority of German patent application no. 10 2020 105 697.4, filed Mar. 3, 2020, the entire content of which is incorporated herein by reference.

FIELD OF THE INVENTION

The present invention relates to a computer-implemented method for locating possible artifacts in a virtually stained histology image. Additionally, the invention relates to a computer program, a non-volatile computer-readable storage medium and a data processing system for locating possible artifacts in a virtually stained histology image.

BACKGROUND OF THE INVENTION

Previously commonplace histological methods are based on a specimen being taken and a section being created from the latter, the section then being stained by means of suitable substances. Staining by means of hematoxylin and eosin (H&E) is a frequently used method in this context. However, the staining of histological sections can also be based on other substances. By way of example, immunohistochemical methods (IHC) are based on marked antibodies, which bind to certain antigens in the biological tissue. Since such methods require the creation of section preparations, they are relatively complicated. Moreover, the results can vary from dissector to dissector.

In recent times, attempts have been made to generate virtually stained histology images. To this end, an image is recorded using an imaging method and stained with the aid of an imaging rule obtained by means of a deep learning algorithm. In this way, it is possible, for example, for an image that has been obtained by means of a scanning imaging method with a high spatial resolution to experience staining which corresponds to H&E staining or IHC staining, for example. By way of example, methods for virtual staining of images are known from: Y. Rivenson et al. "PhaseStain: the digital staining of label-free quantitative face microscopy images using deep learning" in Light: Science & Applications (2019)8:23; N. Bayramoglu et al. "Towards Virtual H&E Staining of Hyperspectral Lung Histology Images Using Conditional Generative Adversarial Networks" IEEE International Conference on Computer Vision Workshop (ICCVW, Oct. 22-29, 2017); Y. Rivenson "Virtual histological staining of unlabeled tissue-autofluorescence images via deep learning" in nature biomedical engineering 3,466-477 (2019); A. Rana et al. "Computational Histological Staining and Destaining of Prostate Core Biopsy RGB Images with Generative Adversarial Neural Networks" in ArXiv: 1811.02642v1 [cs.CV] Oct. 26, 2018 and US 2010/0128988 A1.

By way of example, since two dyes which respond to different cell structures are used in conventional H&E staining and the scanning imaging methods frequently only supply grayscale images, virtual staining cannot be implemented by a one-to-one mapping from grayscales to a certain color, and so the imaging rule must also take account of the morphology of the tissue in order to convert the one-dimensional brightness information in the grayscale image to a two-dimensional color information in the case of H&E staining. Since such a mapping rule typically does not have a unique mapping, morphological structures which are not physically present may arise in the stained image as a result of the staining. Such morphological structures represent artifacts from the virtual staining and harbor the risk of an incorrect diagnosis being made on the basis of the virtually stained image.

SUMMARY OF THE INVENTION

It is therefore an object of the present invention to provide a computer-implemented method, a computer program, a non-volatile computer-readable storage medium and a data processing system for locating possible artifacts in a virtually stained histology image.

In the computer-implemented method for locating possible artifacts in a virtually stained histology image, which was obtained from an initial histology image, at least one further image is generated on the basis of the virtually stained histology image or the initial histology image. If the at least one further image was created on the basis of the initial histology image, the differences between the at least one further image and the virtually stained histology image are ascertained. By contrast, if the at least one further image was created on the basis of the virtually stained histology image, the differences between the at least one further image and the initial histology image are ascertained. A mapping from the ascertained differences to their positions in the virtually stained histology image is created for the ascertained differences, the positions in the virtually stained histology image representing the positions of possible artifacts. By way of example, the mapping can be implemented by a registration of the images which allows pixel positions of the located differences to be identified with pixel positions in the virtually stained histology image. If there is no change in the image section and the resolution when generating the virtually stained image from the initial histology image and when generating the further image, it is possible to equate the pixel positions of the differences located during the comparison with the pixel positions in the other images. Optionally, the further image can be displayed on a monitor, for example. However, there is no necessity for this within the scope of the present invention.

In the computer-implemented method according to the invention, the initial histology image may be available in grayscales; by way of example, this is the case if the initial histology image is a fluorescence image. The at least one further image can then be obtained by converting the virtually stained histology image into a grayscale image. In the process, the grayscale image can be obtained by means of conventional image processing methods and, for example, can represent relative luminance, luma or lightness of the virtually stained histology image. Then, the differences between the grayscale image obtained from the virtually stained histology image and the initial histology image available in grayscales are ascertained as the differences between the further image and the initial histology image. In the process, information items about the staining of the histology image can also be taken into account when ascertaining the differences.

In an alternative configuration of the computer-implemented method according to the invention, the virtually stained histology image is stained by means of a first trained neural network. A virtually stained comparison histology image is generated as the at least one further image, a second trained neural network being used to generate the comparison histology image, the second trained neural network differing from the first trained neural network in terms of its algorithm and/or the employed training method and/or the training data used in the training method. Then, the differences between the comparison histology image and the virtually stained histology image are ascertained as the differences between the further image and the virtually stained histology image.

Thus, what is common to all configurations of the method according to the invention is that an image which corresponds in terms of its chromaticity to the initial histology image or to the virtually stained histology image and which is then compared thereto is created as the at least one further image, wherein the colors are achromatic colors in the case of a comparison with the initial histology image and chromatic colors in the case of a comparison with the virtually stained histology image. Image regions that do not differ from one another in the two images compared with one another can be considered to be artifact-free in this case since it is unlikely that the images generated in different ways have the same artifacts. The regions in which the two images differ from one another harbor the risk of artifacts being present at this point in the virtually stained histology image. In this way, image regions where there is a risk of artifacts can be located and identified in the virtually stained histology image using the method according to the invention.

Here, the variant in which a grayscale image is generated as a further image from the virtually stained histology image offers the advantage that the conversion of the virtually stained histology image into a grayscale image can be implemented using standard image processing methods that can be carried out relatively easily. By contrast, the variant in which a virtually stained comparison histology image is generated from the initial histology image by means of a second trained neural network offers the option of setting certain priorities, for example if knowledge about the type of possible artifacts is present, by way of a targeted selection of the training method and/or the training data and/or the algorithm used in the trained neural network. Moreover, this variant provides the option of creating not only a comparison histology image but also third, fourth or even further comparison histology images using further trained neural networks, which differ from the two first neural networks in terms of their algorithm and/or the used training method and/or the training data used during training, wherein each of the third, the fourth or the even further comparison histology images are compared to the virtually stained histology image. In this way, it is possible to determine whether an artifact located during a comparison is present in the virtually stained histology image or in the comparison histology image used for comparison purposes. By way of example, if the comparison of the virtually stained histology image with a first comparison histology image exhibits an artifact which is not present during the comparison of the virtually stained histology image with the remaining comparison histology images, the assumption can be made that the artifact is present in the first comparison histology image but not in the virtually stained histology image. By way of example, it is possible to exclude artifacts that are only present in the comparison with one comparison histology image but not present in the comparison with the other comparison histology images from artifacts of the virtually stained histology image. It is also possible to weight possible artifacts, the weighting of a possible artifact being higher, the more comparisons with comparison images exhibit an artifact of the corresponding point in the virtually stained image.

By way of example, one of the following methods can be used to ascertain the differences between the at least one further image and the virtually stained histology image or the at least one further image and the initial histology image:
a) pixel-by-pixel ascertainment of the difference in the pixel intensity between the at least one further image and the virtually stained histology image or pixel-by-pixel ascertainment of the difference in the pixel intensity between the at least one further image and the initial histology image;
b) pixel-by-pixel ascertainment of the optical flow in the at least one further image in relation to the virtually stained histology image or pixel-by-pixel ascertainment of the optical flow in the at least one further image in relation to the initial histology image, with an optical flow with a value of 0 meaning that no artifact is present;
c) comparing the morphologies in the at least one further image with the morphologies in the stained histology image or comparing the morphologies in the at least one further image with the morphologies in the initial histology image;
d) ascertaining the edges in the at least one further image and also in the virtually stained histology image or in the initial histology image and comparing the morphologies of the edges ascertained for the at least one further image with the morphologies of the edges ascertained for the virtually stained histology image or comparing the morphologies of the edges ascertained for the at least one further image with the morphologies of the edges ascertained for the initial histology image;
e) ascertaining the differences with the aid of a neural network trained to ascertain differences, wherein the neural network has been trained, for example, by means of a multiplicity of training data records, which each contain an initial histology image or a histology image and at least one further image obtained from the initial histology image or the histology image and also information about the differences between the respective initial histology image or histology image and the at least one further image obtained therefrom.

In principle, it is also possible to use more than one method for ascertaining the differences. This can prevent an artifact arising by the comparison from being considered to be an artifact of the virtually stained image. Particularly if an artifact is only based on one of the comparison methods and is not located with the other comparison methods, the assumption can be made that the artifact was generated during the comparison and was not already present in the virtually stained histology image.

The possible artifacts in the virtually stained histology image can be marked within the scope of the computer-implemented method according to the invention on the basis of the mapping from their positions at least in one section of the virtually stained histology image. In particular, the section of the virtually stained histology image in which the artifacts are marked can also be the entire virtually stained histology image. Moreover, the method might permit the user-controlled superimposition and masking of the markings. In this way, there is not only the option of displaying the locations of possible artifacts but also that of observing the virtually stained histology image without markings. Instead of marking possible artifacts in the virtually stained histology image, there is also the option of generating a mask for the virtually stained histology image on the basis of the mapping from the located differences to their positions in the virtually stained histology image, the possible artifacts being able to be masked in the stained histology image with the aid of the mask. By way of example, such a configuration allows the masked regions to be excluded from a possible processing of the virtually stained histology image.

The computer-implemented method according to the invention can offer the user the option of defining a display region, which corresponds to a section of the virtually stained histology image and in which the possible artifacts present therein are marked or masked with the aid of the mask. Here, the definition of the display region can also be linked to a magnification of the image such that the positions and boundaries of the artifacts can be studied in more detail.

There also is the option of ascertaining a statistic for at least one section of the virtually stained histology image within the scope of the method according to the invention, the statistic specifying the probability for the possible artifacts positioned in this image section actually being artifacts. In the case of a comparison of the virtually stained histology image or the initial histology image with more than one further image, the statistic can be based on the number of comparisons in which an artifact was found. However, a statistic can also be ascertained in the case of a comparison with only one further image, for example if a plurality of comparison methods are used for the comparison of the further image with the virtually stained histology image or with the initial histology image. In this case, the statistic can depend on the number of comparison methods in which the respective artifact was ascertained. Moreover, there is the option of specifying a statistic which, for certain sections of an image, indicates the probability that the artifacts indicated therein are actually artifacts. In this way, it is possible to indicate regions in the virtually stained histology image, in which the probability for the presence of artifacts is higher than in other regions.

Since the method according to the invention is able to supply quick information about possible artifacts in a histology image virtually in real time, it is particularly suitable for use in confocal endomicroscopy carried out in vivo. By way of example, confocal endomicroscopy carried out in vivo can be used within the scope of surgery to obtain histology images. Since fast results are generally important within the scope of surgery, fast information about possible artifacts in the recorded histology image is needed.

Moreover, a computer program for locating possible artifacts in a virtually stained histology image, which was obtained from an initial histology image, is provided according to the invention, the computer program comprising instructions which, when executed on a computer, cause the computer to
  generate a further image on the basis of the virtually stained histology image or the initial histology image,
  ascertain the differences between the at least one further image and the virtually stained histology image if the at least one further image has been generated on the basis of the initial histology image or ascertain the differences between the at least one further image and the initial histology image if the at least one further image has been generated on the basis of the virtually stained histology image, and
  create a mapping from the ascertained differences to their positions in the virtually stained histology image, the positions in the virtually stained histology image representing the positions of possible artifacts.

The computer program according to the invention facilitates the implementation of the computer-implemented method according to the invention, possibly including the developments thereof, on a computer or any other data processing system.

Moreover, a non-volatile computer-readable storage medium with instructions stored thereon, the instructions serving to locate possible artifacts in a virtually stained histology image, which was obtained from an initial histology image, is made available according to the invention. The non-volatile computer-readable storage medium comprises instructions which, when executed on a computer, cause the computer to
  generate a further image on the basis of the virtually stained histology image or the initial histology image,
  ascertain the differences between the at least one further image and the virtually stained histology image if the at least one further image has been generated on the basis of the initial histology image or ascertain the differences between the at least one further image and the initial histology image if the at least one further image has been generated on the basis of the virtually stained histology image, and
  create a mapping from the ascertained differences to their positions in the virtually stained histology image, the positions in the virtually stained histology image representing the positions of possible artifacts.

The non-volatile computer-readable storage medium according to the invention facilitates loading of the computer program according to the invention, possibly including the developments thereof, onto a computer or any other data processing system.

Finally, a data processing system comprising a processor and at least one memory is also provided according to the invention, wherein the processor is configured to locate possible artifacts in a virtually stained histology image, which was obtained from an initial histology image, on the basis of instructions of a computer program stored in the memory. To this end, the computer program stored in the memory comprises instructions which cause the processor to
  generate a further image on the basis of the virtually stained histology image or the initial histology image,
  ascertain the differences between the at least one further image and the virtually stained histology image if the at least one further image has been generated on the basis of the initial histology image or ascertain the differences between the at least one further image and the initial histology image if the at least one further image has been generated on the basis of the virtually stained histology image, and
  create a mapping from the ascertained differences to their positions in the virtually stained histology image, the positions in the virtually stained histology image representing the positions of possible artifacts.

The data processing system according to the invention, which can be embodied as a computer in particular, allows the computer-implemented method according to the invention, possibly including the developments thereof, to be carried out.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
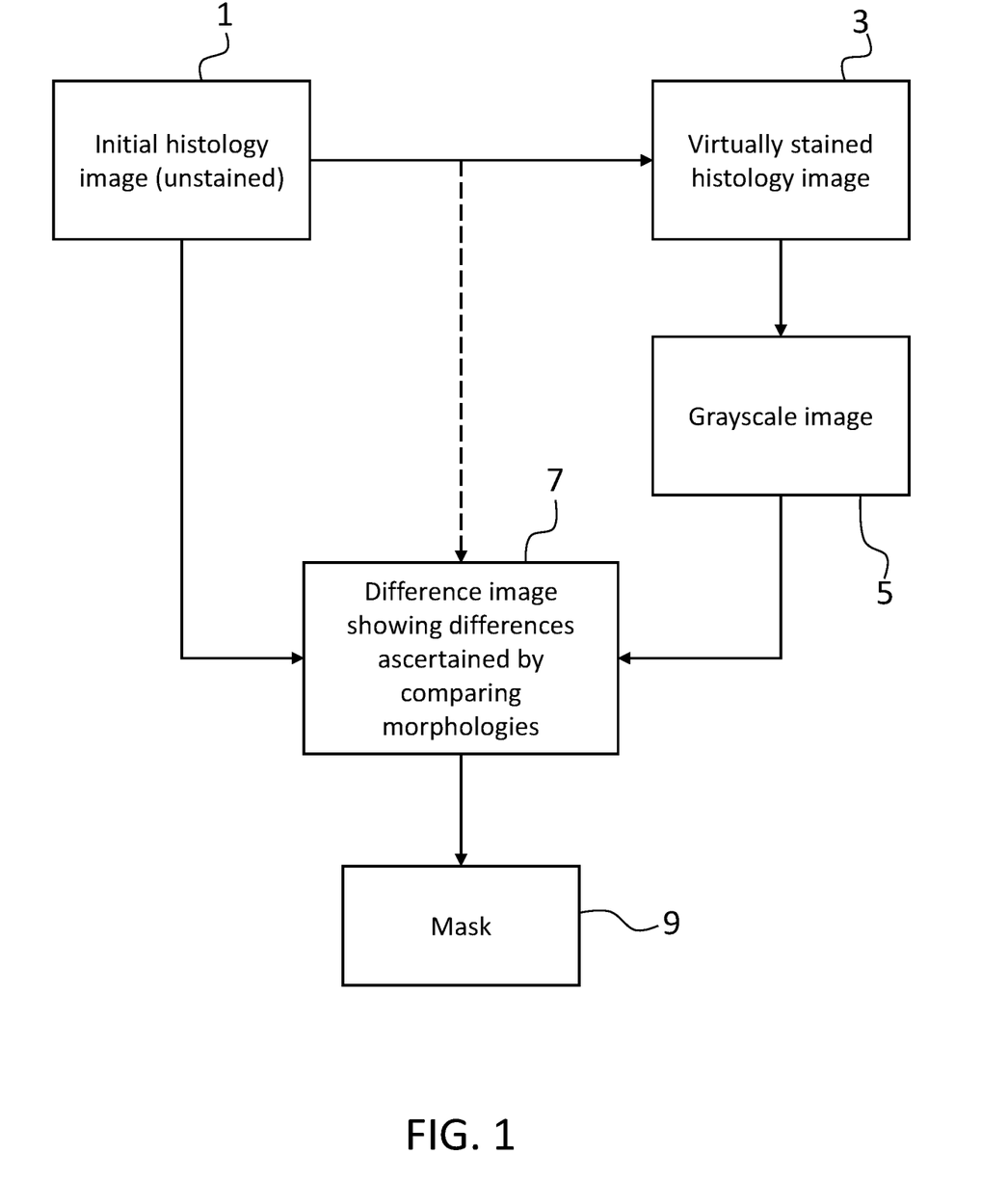
FIG. 1 shows very schematically images which find use within the scope of a first embodiment of the method for locating possible artifacts in a virtually stained histology image, and the relationships between these images in the form of a block diagram.
Figure 2:
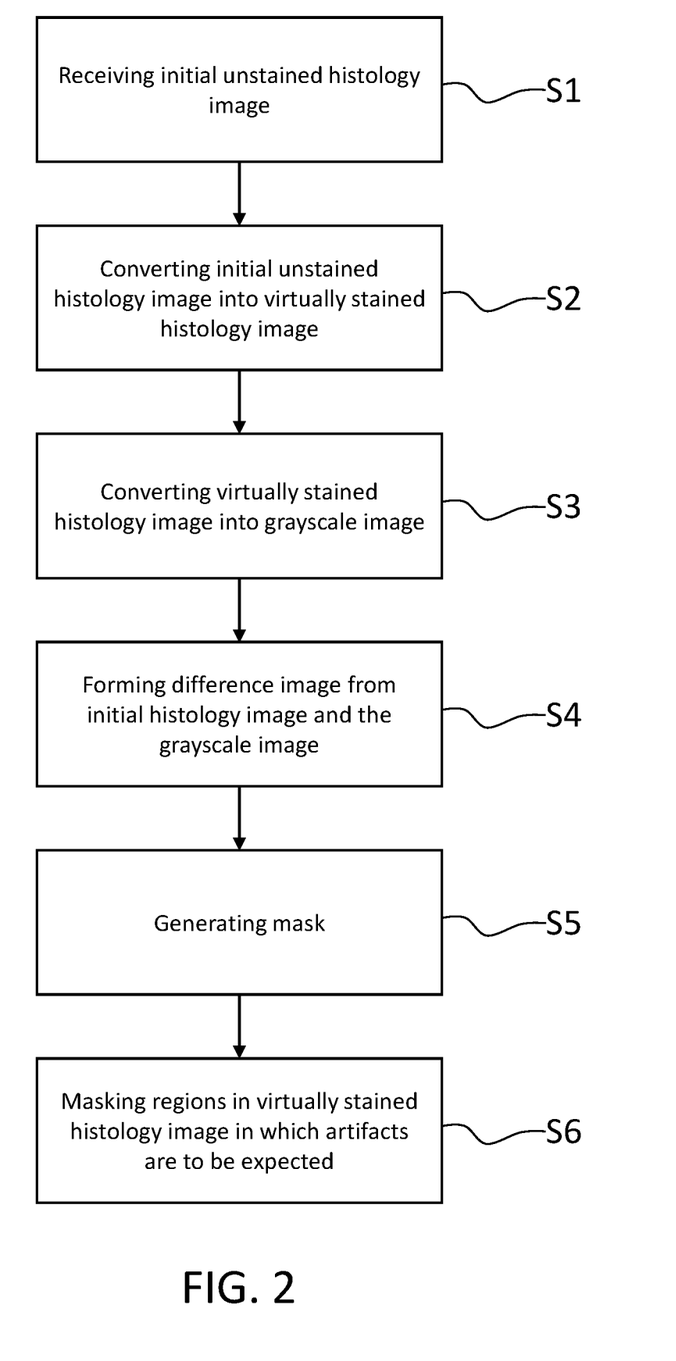
FIG. 2 shows the method steps of the method according to the first embodiment in the form of a flowchart.

A first embodiment for the computer-implemented method for locating possible artifacts in a virtually stained histology image is described below with reference to FIGS. 1 and 2. While FIG. 1 represents the relationships between the images used within the scope of the method, FIG. 2 shows, in the form of a flowchart, the method steps carried out during the first embodiment of the method.

Within the scope of the first embodiment, use is made of an initial histology image 1 available in grayscales, which is stained virtually by means of a trained neural network in order to obtain a virtually stained histology image 3. Here, staining is implemented on the basis of morphological criteria, which have been provided for the trained neural network by means of deep learning or by means of any other method of machine learning in the present embodiment. Suitable algorithms and learning methods are described in the prior art cited at the outset. Reference is made to these documents in respect of suitable algorithms and learning methods.

The training data record used for training the neural network can comprise, for example, grayscale images of histological sections recorded before the latter were stained and color images recorded after the sections were stained. By way of example, staining of the histological sections can be implemented with the aid of hematoxylin and eosin (H&E staining). Since tissue structures with different morphologies have different staining in sections having staining such as H&E staining, for example, the neural network can learn to map certain colors to certain morphologies, that is, certain tissue structures, on the basis of the training data record, and so the neural network can ultimately identify certain tissue structures in the grayscale image 1 on the basis of morphological criteria and can virtually stain these in accordance with the trained staining. By training the neural network with sections that have been stained using a different staining method to H&E staining, for example using immunohistochemical staining methods (IHC), the neural network is able to create virtual stained histology images 3, the staining of which corresponds to this other staining method.

By way of example, the grayscales of the initial histology image 1 can represent fluorescence intensities of a specific tissue region, with bright regions of the grayscale image representing a high intensity of the fluorescence radiation and dark regions representing a low intensity of the fluorescence radiation. By way of example, such an initial histology image 1 can be recorded with the aid of a confocal endomicroscope, with the aid of optical coherence tomography (OCT) or the like. Typically, the initial histology image 1 has such a resolution that individual cells can be identified in the image. Preferably, the resolution is even so high that the structures of individual cells, such as the cell nucleus, for example, can be identified. In particular, the resolution can be 10 μm or better, for example 5 μm, 3 μm, 1 μm or 0.7 μm. Consequently, the initial histology image 1 represents an image which allows the identification of tissue types, in particular tumor cells, on the basis of morphological criteria such as the cell structure, the size of the cell nucleus, et cetera. Typically, the initial histology image 1 shows an object section of 1 $mm^2$ or less, for example 0.5 $mm^2$, 0.2 $mm^2$, 0.1 $mm^2$ or even less. A fluorescent dye can be used to excite the fluorescence in the tissue, for example the fluorescent metabolite protoporphyrin IX (PpIX). Even though the initial histology image 1 within the scope of the present embodiments is a fluorescence image, other grayscale images can also be used as initial histology image 1 provided these facilitate the classification of tissue on the basis of morphological criteria.

The virtually stained histology image 3 is converted into a grayscale image 5 within the scope of the first embodiment. Various methods can be used to convert the virtually stained histology image 3 into the grayscale image 5. By way of example, in the simplest case, the grayscale value of a picture element can be calculated from the values R for red, G for green and B for blue by virtue of the mean value of its individual color values being calculated for each picture element in accordance with the equation $Y=(R+G+B)/3$. However, it is also possible to calculate the relative luminance by means of a weighted sum as per the equation $Y=02126R+0.7152G+0.0722B$. Moreover, there is the option of forming the sum of the maximum color value of red, green and blue and of the minimum color value of red, green and blue and halving this sum according to the equation $Y=(max(R,G,B)+min(R,G,B))/2$. It is clear to a person skilled in the art that further methods of digital image processing are available for converting color images into grayscale images, all of which are suitable, in principle, for converting the virtually stained histology image 3 into the grayscale image 5. The intensity can also be normalized when converting the virtually stained histology image 3 into the grayscale image 5, for example in such a way that a black picture element has a value of 0 and a white picture element has a value of 1 or in such a way that a black picture element has a value of 0 and a white picture element has a value of $2^n$, wherein n can be an integer, particularly from the range of 8 to 16. If the grayscale image 5 is normalized, it is advantageous if the initial histology image 1 is also normalized in the same way.

Then, a difference image 7 is created from the initial histology image 1 and the grayscale image 5, the difference image showing the differences between the initial histology image 1 and the grayscale image 5. In particular, the difference image 7 can also be a grayscale image, in which the value of a picture element represents the difference in the values of the corresponding picture elements in the initial histology image 1 and in the grayscale image 5. In this case, bright regions in the difference image, for example, might represent those regions in which there are significant differences between the initial histology image 1 and the grayscale image 5 and dark regions—in particular black regions—might represent those regions in which no differences are present. As an alternative to purely calculating the difference between the picture elements, there also is the option of ascertaining an optical flow for each picture element. By way of example, the check can be carried out for a picture element in the initial histology image 1 as to whether the grayscale image 5 contains a picture element in the neighborhood of the picture element corresponding to the picture element in the initial histology image 1, the value of the neighborhood picture element corresponding within certain boundaries to the value of the picture element in the initial histology image 1. If such a picture element is located, the displacement vector between the picture element of the grayscale image 5 corresponding to the picture element in the initial histology image 1 and the located picture element is ascertained. The totality of all displacement vectors in the grayscale image 5 represents the optical flow. If an optical flow is found, its displacement vectors indicate the differences between the initial histology image 1 and the grayscale image 5, the differences indicating artifacts in the grayscale image 5. Moreover, it is possible to ascertain the difference by virtue of comparing the morphologies in the initial histology image 1 to the morphologies in the grayscale image 5. To this end, use can be made of a trained neural network which is trained on the basis of a multiplicity of initial histology images and grayscale images, wherein the grayscale images were created by converting virtually stained histology images which are based on the respective initial histology images. When creating the difference image 7, information items about the staining of the histology image can optionally also be taken into account, as indicated in FIG. 1 by the dashed line.

Figure 6:
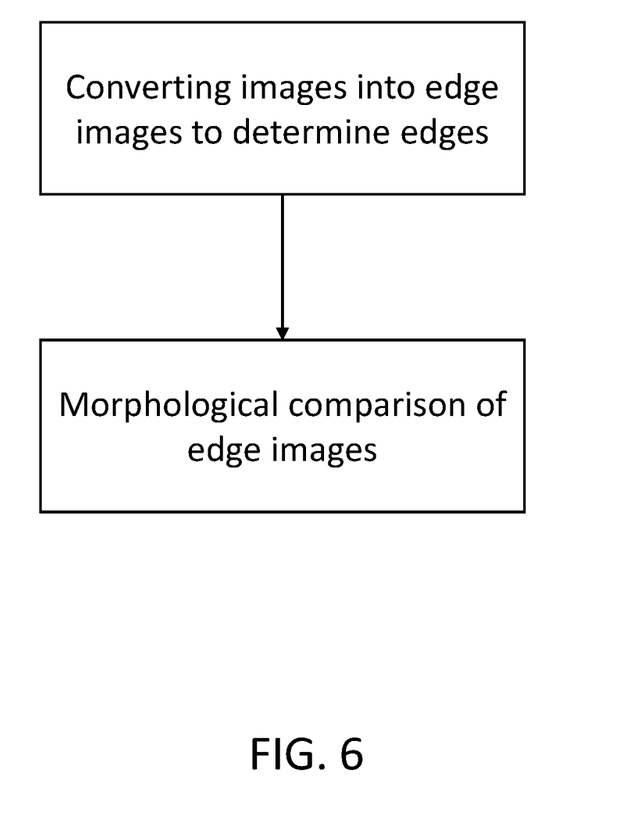

Even though there is a direct comparison between the initial histology image 1 and the grayscale image 5 in the present embodiment, there is also the option of initially converting the initial histology image 1 and the grayscale image 5 into edge images (see FIG. 6), which show the edges present in the initial histology image 1 and in the grayscale image 5, and then of undertaking the comparison on the basis of the edge images. By way of example, the initial histology image 1 and the grayscale image 5 can be converted into edge images by means of a high-pass filter, by means of which points with high gradients in the pixel intensity are highlighted in an image. Then, the comparison between the initial histology image 1 and the grayscale image 5 is implemented on the basis of the initial histology image 1 processed by means of the high-pass filter and the grayscale image 5 processed by means of the high-pass filter. The comparison between the initial histology image 1 processed by means of the high-pass filter and the grayscale image 5 processed by means of the high-pass filter can be implemented using the same processes as have been described in relation to the direct comparison between the initial histology image 1 and the grayscale image 5, that is, by calculating the difference of the values of the picture elements for each picture element, by ascertaining the optical flow, by a morphological comparison, et cetera.

Then, a mask 9 containing transparent and non-transparent regions is generated on the basis of the obtained difference image 7 in the present embodiment. The mask 9 can then be used to mask, that is, conceal, those regions in the virtually stained histology image 3 in which there is a high probability of artifacts being present. In the process, the user has the option of superimposing and masking the mask such that they can observe the virtually stained histology image with and without the mask 9. Here, the transparent regions correspond to those regions in which there are no differences between the initial histology image 1 and the grayscale image 5 and the non-transparent regions correspond to those regions in which there are differences between the initial histology image 1 and the grayscale image 5. Since the difference image 7 in the present embodiment is a grayscale image in which dark regions indicate that there are no differences between the initial histology image 1 and the grayscale image 5 and bright regions indicate that differences are present, it is advantageous if a threshold is specified for the values of the picture elements, the assumption being made that there is no relevant difference if the threshold is undershot and there is a relevant difference if the threshold is met or exceeded. To generate the mask 9 from the difference image 7, all of the regions in which the threshold is not exceeded become transparent regions while the regions where the threshold is met or exceeded become non-transparent regions. Although there is also the option of creating a mask 9 with a continuously varying degree of transparency in accordance with the intensity value in the difference image, it is however also advantageous in this case if a threshold for the intensity value in the difference image is set and all regions of the mask 9 with an intensity value below the threshold are set to full transparency so as not to impair the visibility of artifact-free regions when the mask is applied to the virtually stained histology image. All intensity values above the threshold then lead to reduced degrees of transparency of the corresponding mask regions. Then, for instance, the degree of transparency can serve as a measure for the probability of an artifact, the probability of the presence of an artifact increasing with decreasing transparency of the mask 9.

Since the initial histology image 1, the virtually stained histology image 3, the grayscale image 5, the difference image 7 and the mask 9 each represent the same image section with the same image resolution in the present embodiment, the mask 9 represents a mapping from the ascertained differences to their positions in the virtually stained histology image. Since the differences are those regions in which artifacts are to be expected, the positions of the non-transparent regions in the mask 9 represent the positions of possible artifacts in the virtually stained histology image 3.

Instead of using a mask 9, there also is the option in the present embodiment of labeling the regions in the virtually stained histology image 3 by suitable highlighting in the virtually stained histology image 3 on the basis of the inverted mask 9, for example by blackening these regions or labeling these regions with a color not present otherwise in the virtually stained histology image 3. Moreover, there is the option of generating a heat map, in which certain colors represent the degree of difference in the difference image and, in the process, can serve as a measure for the probability of an artifact, on the basis of the values in the difference image, the intention being to superimpose the heat map on the virtually stained histology image 3.

Moreover, there is the option of providing a virtual magnifying glass in the present embodiment, the virtual magnifying glass allowing a user to select a small image region of the virtually stained histology image 3 and allowing the small region to be presented in magnified fashion. If a mask 9 is present, the latter is also increased in size accordingly. Here, there is also the option of specifying a statistic for the selected image section, the statistic indicating how high the probability is for there to be artifacts in this image section. Naturally, such a statistic can also be specified for the entire image and not only for magnified image sections.

The method steps of the first embodiment are described below with reference to FIG. 2.

A computer or any other data processing system receives the initial histology image 1 in step S1, the initial histology image subsequently being converted into the virtually stained histology image 3 in step S2. Here, obtaining the initial histology image 1 and generating the virtually stained histology image 3 are implemented as described with reference to FIG. 1.

In step S3, the virtually stained histology image 3 is converted into a grayscale image 5, as described with reference to FIG. 1.

The difference image 7 is formed in step S4 from the initial histology image 1, which is available in grayscales like the grayscale image 5, and the grayscale image 5. Here, use can be made of the methods described with reference to FIG. 1.

Finally, the mask 9 is generated from the difference image 7 in step S5, as has likewise already been explained with reference to FIG. 1. Moreover, the virtually stained histology image is prepared in step S6 by virtue of masking those image regions in which artifacts are to be expected with the aid of the mask 9. As has been described with reference to FIG. 1, there are also other options for highlighting the artifacts in the virtually stained histology image 3 itself, for example by staining the regions having artifacts or in the form of a heat map.

Figure 3:
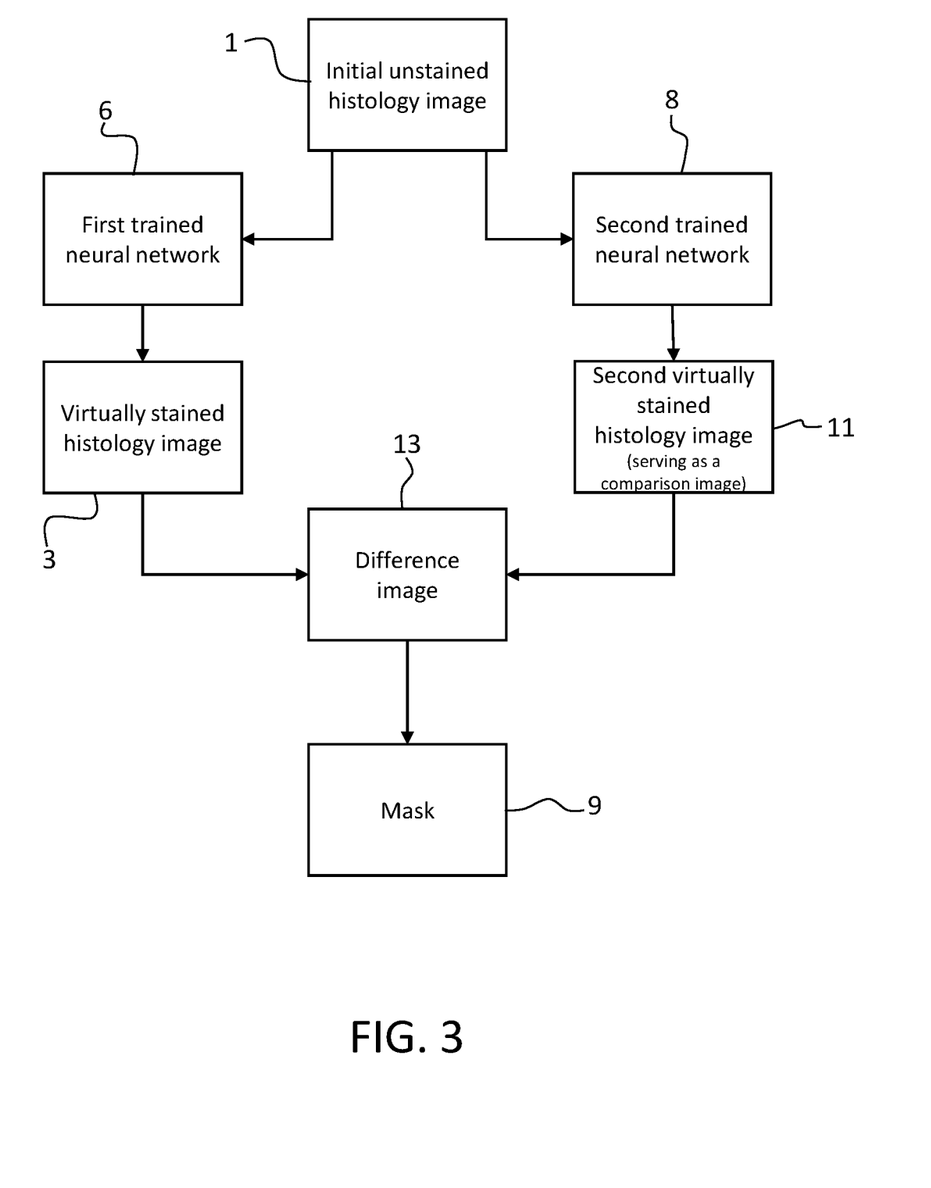
FIG. 3 shows, for a second embodiment of the method for locating possible artifacts in a virtually stained histology image, the images used within the scope of the method and the relationships between these images in the form of a block diagram.
Figure 4:
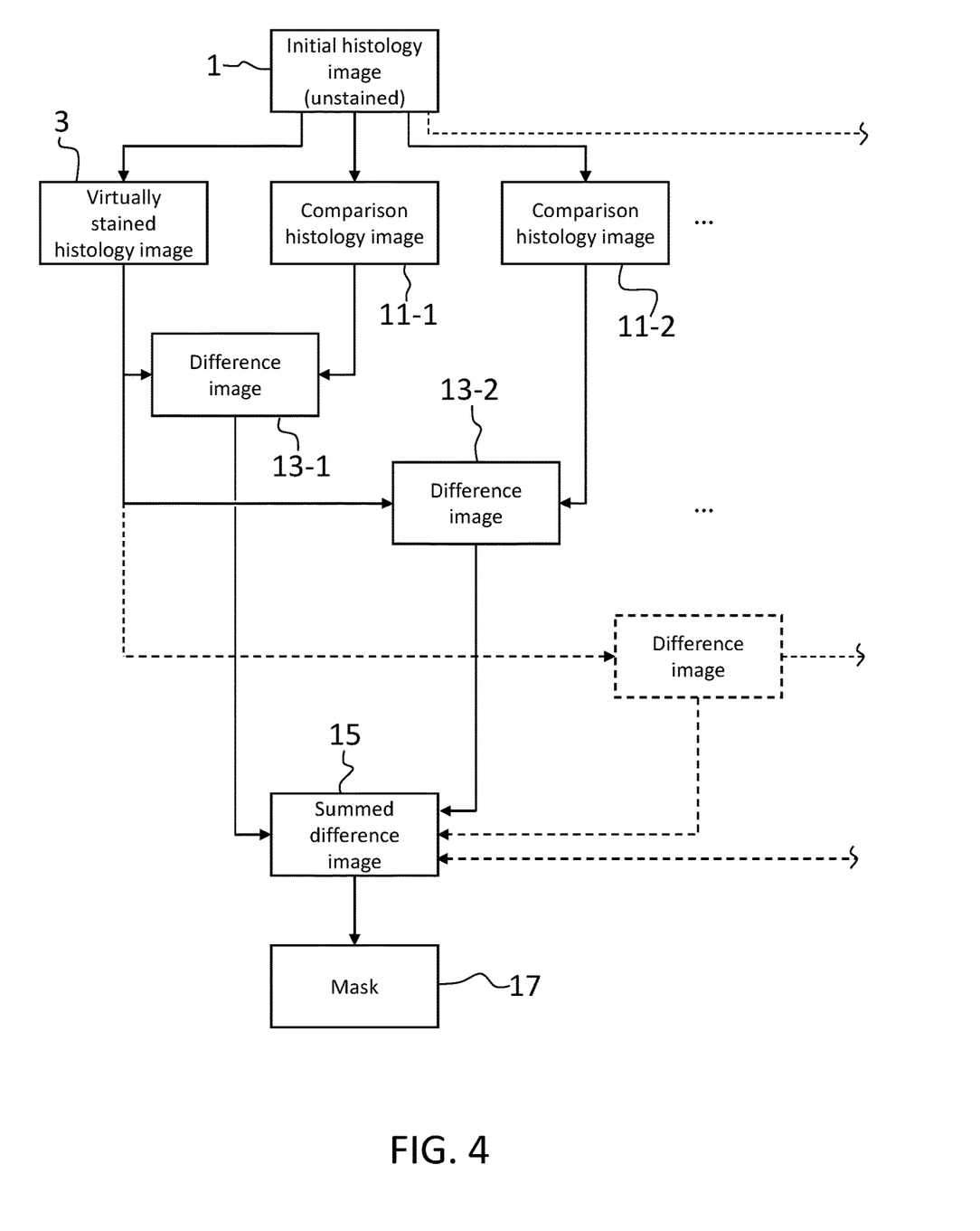
FIG. 4 shows a modification of the embodiment shown in FIG. 3.
Figure 5:
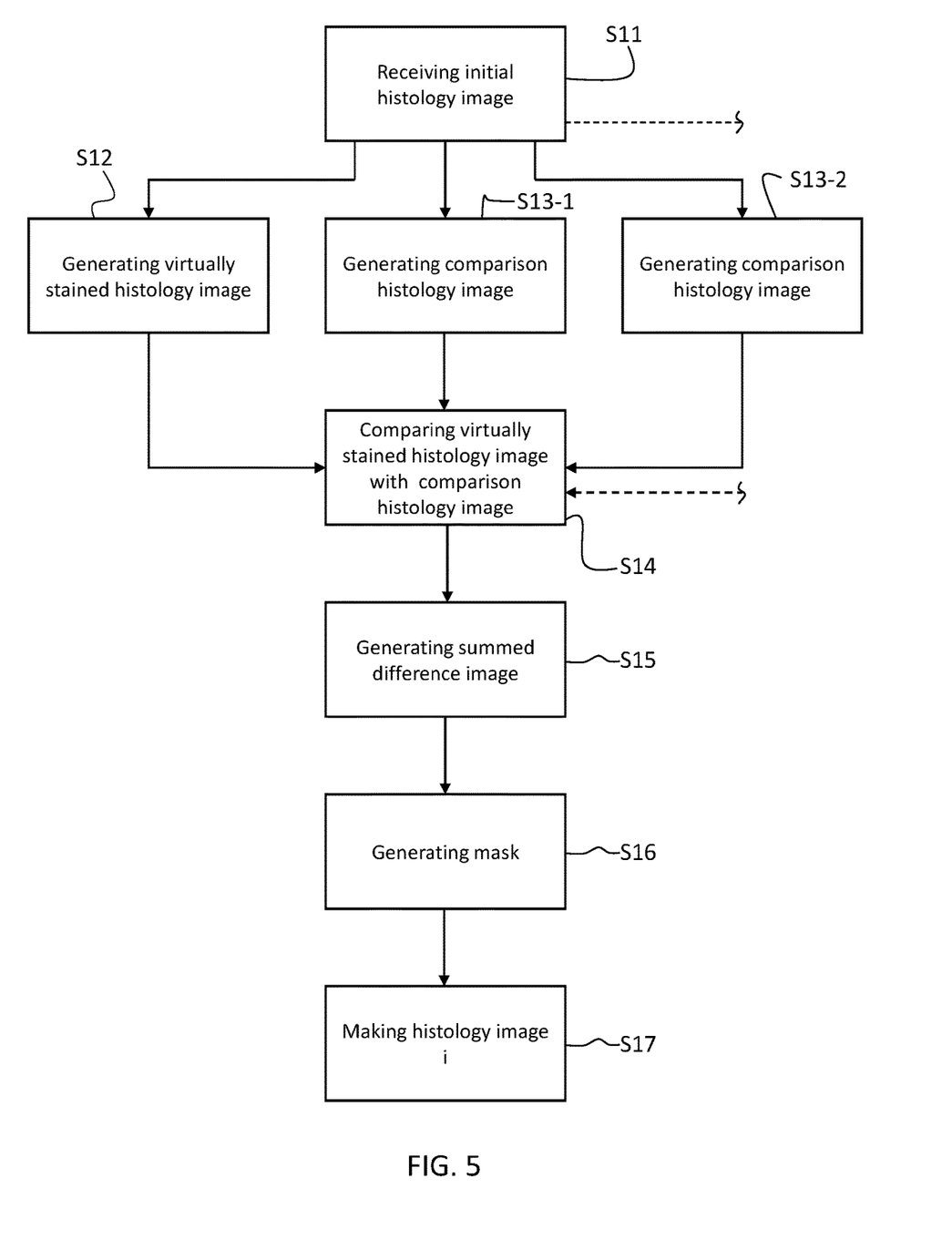
FIG. 5 shows the method steps of the method according to the second embodiment and the modification thereof in the form of a flowchart; and, FIG. shows the method step for converting images into edge images to determine edges.

A second embodiment and a modification thereof will be described below with reference to FIGS. 3 to 5. Here, FIG. 3 shows a schematic illustration of the images used within the scope of the second embodiment and their relationship therebetween. FIG. 4 shows the modification of the second embodiment and FIG. 5 shows the method steps of the second embodiment on the basis of a flowchart.

In FIGS. 3 and 4 of the second embodiment, the images which are present in the same form as in the first embodiment are denoted by the same reference signs as in the first embodiment and are not explained again in order to avoid repetition.

Like the first embodiment, the second embodiment also proceeds from an initial histology image 1 available in grayscales, the initial histology image being able to be a fluorescence image, in particular. What was explained with reference to the initial histology image 1 of the first embodiment applies accordingly to the initial histology image 1 of the second embodiment.

Like in the first embodiment, a virtually stained histology image 3 is generated from the initial histology image 1. Here, use is made of a first trained neural network 6, what was stated with respect to the trained neural network of the first embodiment applying analogously in this case. In contrast to the first embodiment, the virtually stained histology image 3 is not converted into a grayscale image 5 in the second embodiment, however. Instead, a second virtually stained histology image 11, which serves as the comparison histology image, is generated on the basis of the initial histology image 1 with the aid of a second trained neural network 8. In principle, what was stated with respect to the trained neural network of the first embodiment also applies analogously to the second trained neural network, with the second trained neural network however differing from the first trained neural network. Here, the difference can lie in the used algorithm and/or in the used learning method and/or in the training data used in the learning method.

Thereupon, a difference image 13 is generated from the virtually stained histology image 3 and the comparison histology image, the difference image representing the differences between the virtually stained histology image 3 and the comparison histology image 11. By way of example, the difference image 13 can be generated by virtue of the virtually stained histology image 3 and the comparison histology image 11 being split into their color channels, for example into a red color channel, a green color channel and a blue color channel, which each represent grayscale images when considered in their own right. Then, different images can be generated for each of the individual color channels using one of the methods used in the first embodiment. Then, an overall difference image 13 can be generated from the difference images for the individual color channels, for example by virtue of the values of a picture element in the overall difference image 13 being formed by a weighted sum of the values of the corresponding picture element for the individual color channels. The same weights as used in the first embodiment when converting the virtually stained histology image 3 into the grayscale image 5 can be used as weights in the process. However, there also is the option of performing a weighting of the individual color channels which corresponds to the meaning of the respective color when identifying different tissue types, in particular tumorous tissue, in the virtually stained histology image 3.

Like in the first embodiment, a mask 9 is generated from the overall difference image 13, the mask being able to be used as described in relation to the first embodiment, or the points at which the overall difference image 13 indicates artifacts are marked in the virtually stained histology image 3. Like in the first embodiment, marking can be implemented by way of a suitable color or in the form of a heat map.

The generation of the difference images for the individual color channels can either be implemented on the basis of the individual color channels themselves, like in the first embodiment, or on the basis of edge images which were previously obtained from the individual color channels.

Instead of splitting the virtually stained histology image 3 and the comparison histology image 11 into color channels, there also is the option of directly comparing the color images to one another. By way of example, it is also possible to ascertain an optical flow in the process, the latter not representing the flow of an intensity value but the flow of a color value. To this end, it may be advantageous to transform the color images from the RGB color space to a Lab color space. While the brightness information and the color information are available in the form of values for the red color channel, the green color channel and the blue color channel in the RGB color space, these information items are available in the Lab color space in the form of a brightness value, also referred to as L* value or luminance, an a* value, which specifies the green or red component of a color, and a b* value, which specifies the blue or yellow component of a color. Here, negative values of the a* value represent green and positive values represent red while negative values of the b* value represent blue and positive values represent yellow. This allows the optical flow in the brightness to be better separated from the optical flow of the color values.

In a modification of the second embodiment, it is not only one comparison histology image 11 that is created but a plurality of comparison histology images 11-1, 11-2, . . . . Here, the virtually stained histology image 3 and all comparison histology images 11-1, 11-2, . . . are generated by respectively different trained neural networks. Here, the differences in the neural networks can be found in the used algorithms and/or in the used learning methods and/or in the training data used during learning. Then, difference images 13-1, 13-2, . . . are respectively generated from the virtually stained histology image 3 and the comparison histology images 11-1, 11-2, . . . . Here, the difference images 13-1, 13-2, . . . are generated as has been described with reference to FIG. 3. Finally, the individual difference images 13-1, 13-2, . . . are summed to form a summed difference image 15, in which the respective values of the picture elements of the individual difference images 13-1, 13-2, . . . are added picture element by picture element. A normalization can be carried out in the process, which returns the summed difference image 15 to the value range of the individual difference images 13-1, 13-2, . . . . Then, a mask 17 is generated on the basis of the summed difference image 15, as has been described with reference to FIG. 3, or the points at which the summed difference image 15 indicates artifacts are marked in the virtually stained histology image 3. The mask 17 can thus be configured and used like the mask 9 of the first embodiment.

The steps of the method as per the second embodiment are illustrated in FIG. 5 in the form of a flowchart.

In the first step S11, the initial histology image 1 is received, from which the virtually stained histology image 3 (step S12) and the comparison histology images 11-1, 11-2, . . . (step S13-1, step S13-2, . . . ) are generated using different trained neural networks.

The comparison of the virtually stained histology image 3 with the comparison histology images 11-1, 11-2, . . . in step S14 leads to the generation of the difference images 13-1, 13-2, . . . , from which the summed difference image 15 is finally generated in step S15, the mask 9 or 17, with which the virtually stained histology image 3 is masked in step S17, being generated from the summed difference image in step S16. Alternatively, the artifacts in the virtually stained histology image 3 can be marked on the basis of the differences presented in the summed difference image. Here, the virtually stained histology image 3, the comparison histology images 11-1, 11-2, . . . , the difference images 13-1, 13-2, . . . , the summed difference image 15 and the mask 9 and 17 are generated as has been described with reference to FIGS. 3 and 4. If the images and the mask are generated in accordance with the method described with reference to FIG. 3, only step S13-1 of steps S13-1, S13-2, . . . is carried out, and so only one comparison histology image 11-1 is present.

The present invention has been described in detail on the basis of embodiments for explanatory purposes. However, a person skilled in the art recognizes that there may be deviations from the described embodiments within the scope of the present invention. By way of example, a simple grayscale image can be recorded instead of the fluorescence image. Moreover, there is the option of recording a plurality of initial histology images at the same location, the initial histology images showing, for example, the same image section at different depths of the tissue (a so-called z-stack). By way of example, such a z-stack can be generated with the aid of optical coherence tomography. The computer-implemented method can be carried out on a personal computer, a notebook, a tablet or any other data processing system, in particular also on a dedicated data processing system which only serves to carry out the method according to the invention. Moreover, when comparing the virtually stained histology image with a plurality of comparison histology images, there is the option of making the statistic that reproduces the probability of an artifact in a certain image section dependent on the number of comparisons indicating an artifact at this point. Moreover, there is the possibility of generating not only one difference image on the basis of the initial histology image and the grayscale image or on the basis of the virtually stained histology image and a comparison histology image but of generating a plurality of difference images, the difference images each having been generated with a different one of the described methods. By way of example, the statistic can then also depend on how many methods for generating the difference images indicate an artifact at a certain location of the virtually stained histology image. Therefore, the present invention is not intended to be limited by the embodiments but rather only by the appended claims.

It is understood that the foregoing description is that of the preferred embodiments of the invention and that various changes and modifications may be made thereto without departing from the spirit and scope of the invention as defined in the appended claims.

LIST OF REFERENCE SIGNS

1 Initial histology image
3 Virtually stained histology image
5 Grayscale image
6 First trained neural network
7 Difference image
8 Second trained neural network
9 Mask
11 Comparison histology image
13 Difference image
15 Summed difference image
17 Mask
S1 Receiving an initial histology image
S2 Converting the initial histology image into a virtually stained histology image
S3 Converting the virtually stained histology image into a grayscale image
S4 Generating a difference image
S5 Generating a mask
S6 Masking the virtually stained histology image
S11 Receiving an initial histology image
S12 Converting the initial histology image into a virtually stained histology image
S13 Generating a comparison histology image
S14 Generating a difference image
S15 Generating a summed difference image
S16 Generating a mask
S17 Masking the virtually stained histology image

What is claimed is:

1. A computer-implemented method for locating possible artifacts in a virtually stained histology image obtained from an initial unstained histology image, the computer-implemented method comprising the steps of:
   generating at least one further image on the basis of the virtually stained histology image or the initial unstained histology image;
   determining the differences between the at least one further image and the virtually stained histology image when the at least one further image has been generated on the basis of the initial unstained histology image or determining the differences between the at least one further image and the initial unstained histology image when the at least one further image has been generated on the basis of the virtually stained histology image; and,
   creating a mapping of the determined differences to their positions in the virtually stained histology image with the positions in the virtually stained histology image representing the positions of possible artifacts.

2. The computer-implemented method of claim 1, wherein
   the initial unstained histology image is available in grayscales;

the at least one further image is obtained by converting the virtually stained histology image into a grayscale image; and, the differences between the grayscale image and the initial unstained histology image are determined as the differences between the further image and the initial unstained histology image.

3. The computer-implemented method of claim 2, wherein items of information about the staining of the virtually stained histology image are considered when determining the differences between the grayscale image and the initial unstained histology image.

4. The computer-implemented method of claim 1, wherein the virtual stained histology image is stained via a first trained neural network;

at least one virtually stained comparison histology image is generated as the at least one further image, a second trained neural network being used to generate the comparison histology image, said second trained neural network differing from the first trained neural network: as to the algorithm thereof, the employed training method, or the training data used in the training method; and, the differences between the stained histology image and the comparison histology image are ascertained as the differences between the further image and the virtually stained histology image.

5. The computer-implemented method of claim 1, wherein the differences between the at least one further image and the virtually stained histology image or the differences between the at least one further image and the initial unstained histology image are determined by one of the following methods:

comparing the morphologies in the at least one further image with the morphologies in the virtually stained histology image or comparing the morphologies in the at least one further image with the morphologies in the initial unstained histology image; and, determining the edges in the at least one further image and also in the virtually stained histology image or in the initial unstained histology image and comparing the morphologies of the edges determined for the at least one further image with the morphologies of the edges determined for the virtually stained histology image or comparing the morphologies of the edges determined for the at least one further image with the morphologies of the edges determined for the initial unstained histology image.

6. The computer-implemented method of claim 1, wherein the possible artifacts in the virtually stained histology image are marked on the basis of the mapping to their positions at least in one section of the virtually stained histology image.

7. The computer-implemented method of claim 1, wherein a mask for the virtually stained histology image, with the aid of which it is possible to mask the possible artifacts in the stained histology image, is generated on the basis of the mapping from the located differences to their positions in the virtually stained histology image.

8. The computer-implemented method of claim 6, wherein a user is offered the option of defining a display region which corresponds to a section of the virtually stained histology image and in which the possible artifacts present therein are marked or masked with the aid of the mask, with the position of the section in the virtually stained histology image being able to be set by a user.

9. The computer-implemented method of claim 1, wherein a statistic is determined for at least one section of the virtually stained histology image, said statistic specifying the probability for the possible artifacts positioned in this image section actually being artifacts.

10. A computer program for locating possible artifacts in a virtually stained histology image obtained from an initial unstained histology image, the computer program comprising instructions which, when executed on a computer, cause the computer to:

generate a further image on the basis of the virtually stained histology image or the initial unstained histology image;

determine the differences between the at least one further image and the virtually stained histology image when the at least one further image has been generated on the basis of the initial unstained histology image or determine the differences between the at least one further image and the initial unstained histology image when the at least one further image has been generated on the basis of the virtually stained histology image; and, create a mapping from the determined differences to their positions in the virtually stained histology image, the positions in the virtually stained histology image representing the positions of possible artifacts.

11. A non-volatile computer-readable storage medium having instructions stored thereon, said instructions serving to locate possible artifacts in a virtually stained histology image obtained from an initial unstained histology image, the non-volatile computer-readable storage medium comprising instructions which, when executed on a computer, cause the computer to:

generate a further image on the basis of the virtually stained histology image or the initial unstained histology image;

determine the differences between the at least one further image and the virtually stained histology image when the at least one further image has been generated on the basis of the initial unstained histology image or determine the differences between the at least one further image and the initial unstained histology image when the at least one further image has been generated on the basis of the virtually stained histology image; and, create a mapping from the determined differences to their positions in the virtually stained histology image, the positions in the virtually stained histology image representing the positions of possible artifacts.

12. A data processing system comprising:

a processor; and, at least one memory;

said processor being configured to locate possible artifacts in a virtually stained histology image obtained from an initial unstained histology image, on the basis of instructions of a computer program stored in said memory;

wherein the computer program stored in said memory includes instructions which cause the processor to:

generate a further image on the basis of the virtually stained histology image or the initial unstained histology image;

determine the differences between the at least one further image and the virtually stained histology image when the at least one further image has been generated on the basis of the initial unstained histology image or determine the differences between the at least one further image and the initial unstained histology image when the at least one further image has been generated on the basis of the virtually stained histology image; and, create a mapping from the determined differences to their positions in the virtually stained histology image, the positions in the virtually stained histology image representing the positions of possible artifacts.

13. The computer-implemented method of claim 1, wherein the differences between the at least one further image and the virtually stained histology image or the differences between the at least one further image and the initial unstained histology image are determined by pixel-by-pixel determination of the difference in the pixel intensity between the at least one further image and the virtually stained histology image or pixel-by-pixel determination of the difference in the pixel intensity between the at least one further image and the initial unstained histology image.

14. The computer-implemented method of claim 1, wherein the differences between the at least one further image and the virtually stained histology image or the differences between the at least one further image and the initial unstained histology image are determined by one of the following methods:

pixel-by-pixel determination of the optical flow in the at least one further image in relation to the virtually stained histology image or pixel-by-pixel determination of the optical flow in the at least one further image in relation to the initial unstained histology image.

15. The computer-implemented method of claim 1, wherein the differences between the at least one further image and the virtually stained histology image or the differences between the at least one further image and the initial unstained histology image are determined by determining the differences with the aid of a neural network trained to determine differences.

\* \* \* \* \*

UNITED STATES PATENT AND TRADEMARK OFFICE
CERTIFICATE OF CORRECTION

PATENT NO. : 11,210,791 B2
APPLICATION NO. : 17/188866
DATED : December 28, 2021
INVENTOR(S) : S. Saur et al.

It is certified that error appears in the above-identified patent and that said Letters Patent is hereby corrected as shown below:

In the Specification

In Column 7:
Line 13: insert -- 6 -- after "FIG.".

Signed and Sealed this
Third Day of May, 2022

Katherine Kelly Vidal
*Director of the United States Patent and Trademark Office*